Figure 1:
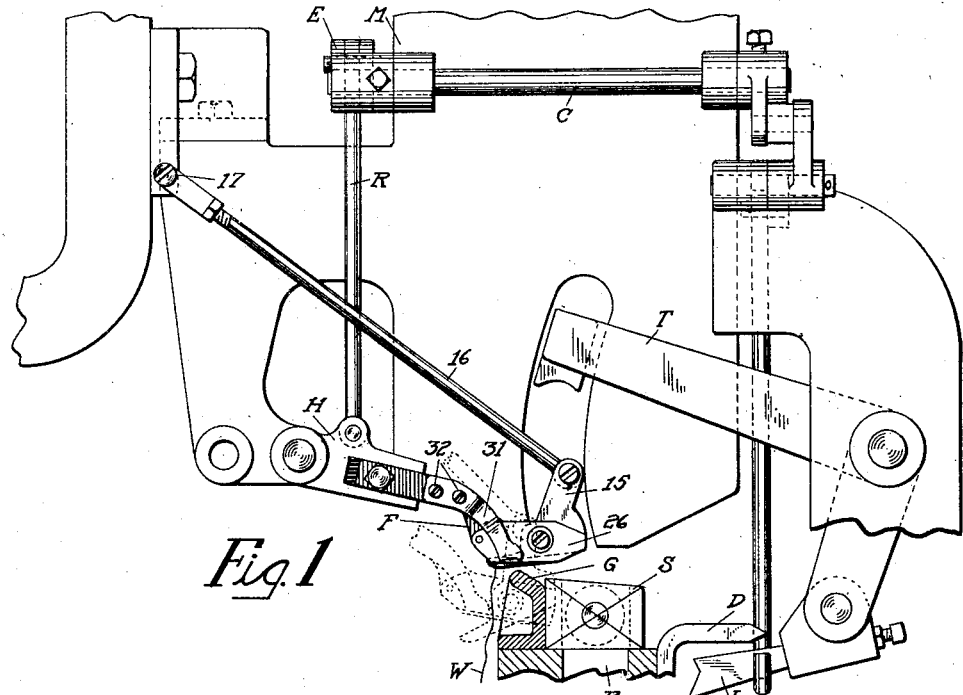

Sept. 3, 1929.   O. V. PAYNE ET AL   1,726,763
THREAD CUTTER FOR LOOMS
Filed Nov. 16, 1927

Inventors
Oscar V. Payne
Richard G. Turner
Attorneys

Patented Sept. 3, 1929.

1,726,763

UNITED STATES PATENT OFFICE.

OSCAR V. PAYNE AND RICHARD G. TURNER, OF WORCESTER, MASSACHUSETTS, ASSIGNORS TO CROMPTON & KNOWLES LOOM WORKS, OF WORCESTER, MASSACHUSETTS, A CORPORATION OF MASSACHUSETTS.

THREAD CUTTER FOR LOOMS.

Application filed November 16, 1927. Serial No. 233,700.

This invention relates to thread cutters for automatic weft replenishing looms more particularly though not necessarily of the multicolor type and it is the general object of the invention to provide an improved form of clamp which will insure contact with the cut thread throughout that part of the cutting movement which occurs after the thread is caught in the clamp.

In co-pending application Ser. No. 127,695 there is shown a thread cutter mounted on the shuttle feeler of a multicolor weft replenishing loom, said cutter being operated by a rod which extends to a fixed point. The form of clamp shown in that application consists of a flat steel spring between which and the movable cutter the cut thread is caught. One spring is made to serve as a clamp and also to hold the movable cutter in proper relation with respect to the relatively fixed cutter and it has been found that it is a difficult matter to keep the sheet steel spring in sufficiently close contact with all parts of the moving cutter to insure retention of the thread should the latter be cut at a point close to the pivot of the cutter. It is an important object of our present invention to provide a thread clamp which is loosely mounted on the shuttle feeler and free to assume varying angular positions with respect to the movable cutter throughout a limited range. In this connection we provide mountings for the clamp which permit the same normally to be yieldingly disposed at a slight angle with respect to the movable cutter, the clamp moving slightly in a lateral direction as the cutter is moved from open to closed position by reason of the advancing point of contact between the clamp and the cutter. With the cutter thus disposed the thread will be held securely no matter at what point it is brought into contact with the clamp. If the thread lies near the pivot of the movable cutter the spring acting on the clamp will hold the latter in contact with the thread even though the part of the clamp remote from the pivot be constantly moving away from the fixed cutter to make room for the movable cutter, and the farther the thread is from the pivot of the cutter the less the remaining angular movement of the clamp and therefore the more favorable the conditions under which it is retained.

It is a further object of our invention to provide a yielding device such as a leaf spring which will engage the floating clamp at a point intermediate its two points of support and preferably below the line joining these points of support so that the clamp will have the lower edge thereof held closely against the moving cutter.

It is frequently desirable to have access to the cutting edges without necessarily dismantling the cutter and with this thought in mind it is a further object of our invention to provide a clamping plate which may be readily removed from the cutter without disturbing the relation of the two cutting elements, this result preferably being achieved by having the stud and spring which give pivotal support and expert pressure on the movable cutter preferably extending through an opening in the clamp to afford one of the loose points of the support for the clamp.

With these and other objects in view which will appear as the description proceeds, our invention resides in the combination and arrangement of parts hereinafter described and set forth in the claims.

Figure 3:
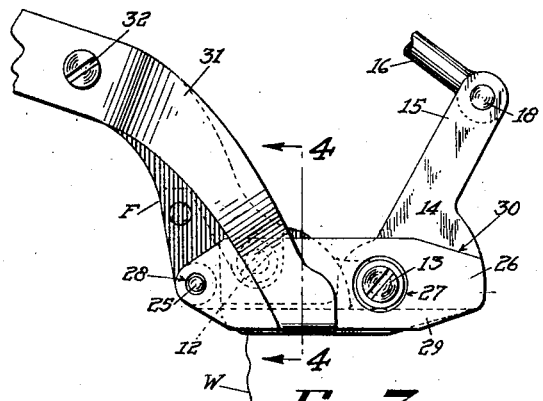
Figure 4:
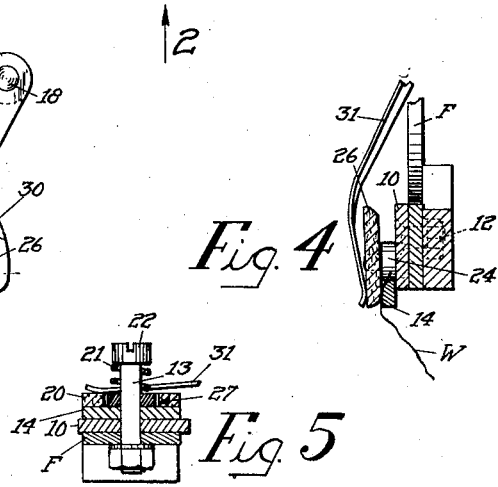
Figure 5:
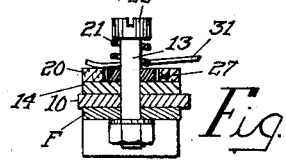
Figure 2:
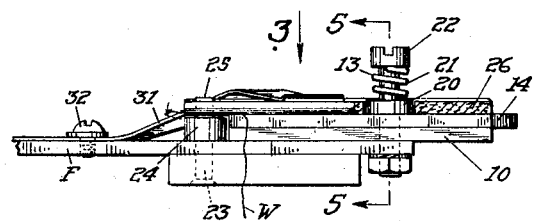

In the accompanying drawings wherein one form of our invention is shown,

Fig. 1 is a side elevation of the lower portion of a multicolor weft replenishing mechanism looking from the interior of the loom with certain parts in section, Fig. 2 is an enlarged bottom plan taken in the direction of arrow 2, Fig. 1, Fig. 3 shows the lower end of the shuttle feeler having the cutter in enlarged scale, and Fig. 4 is a vertical transverse section on line 4—4 of Fig. 3, Fig. 5 is a sectional view on line 5—5 of Fig. 2.

Referring to the drawings the magazine M has pivoted thereto a transferrer arm T to the lower end of which is pivoted a latch L. A dagger D on the lay B comes into engagement with the latch whenever the top shaft C is rocked. A shuttle feeler holder H is pivoted to the magazine frame and is connected to the shaft C by a rod R and lever E secured to the shaft C. A shuttle feeler F is adjustably secured in the holder H and is positioned for engagement with the shuttle S when the latter is improperly positioned on a transferring beat of the loom and with the back of the box G to reset the magazine. The matter thus far described is of common construction and substantially the same as set forth in prior patents to Ryon No. 1,022,108 and 1,030,748.

The cutter includes a cutting blade 10 secured to the shuttle feeler by two bolts 12 and 13, respectively, stud 13 also forming the pivot for the movable cutter blade 14. Said cutter blade has an upwardly extending arm 15 to which is pivoted the lower end of adjustable rod 16 the upper end of which moves around a fixed center indicated at 17. The pivot for the holder H and the fixed pivot 17 are so related with respect to the stud 13 and the pivotal connection 18 between the rod 16 and movable cutter that as the shuttle feeler moves down from the full to the dotted line position shown in Fig. 1 the pivoted jaw or cutter member will move relatively to the fixed cutter to assume the open position indicated in dotted lines in Fig. 1. After transfer the back of the box G will engage the shuttle feeler F to raise the same, whereupon the cutter will be closed to sever the weft W. The operation of the cutter is substantially the same as that set forth in the co-pending application Ser. No. 127,695 filed by Chevrette and the foregoing matter forms no part of our present invention.

In carrying our invention into effect we provide the stud 13 with a collar 20 through which the set screw 13 extends. The collar bears against the movable cutter 14 and receives pressure from a compression spring 21 which lies between the head 22 of the screw 13 and said collar. The latter is preferably though not necessarily slightly larger in diameter than the head 22.

A stud 23 is riveted to the shuttle feeler and has an enlarged shoulder portion 24 from which inwardly projects a pin 25. As shown in Fig. 3 the pin 25 and screw 13 are preferably in a line substantially parallel to the cutting edge of the fixed cutter member 10. The shoulder portion 24 has the surface thereof opposite the fixed cutter out of the plane of and below the upper surface of the pivoted cutter 14 as viewed in Fig. 2.

The clamping member 26 is provided with two openings the larger of which 27 is of sufficient size to pass both the head 22 and the collar 20 while the smaller opening 28 is sufficiently large to receive the pin 25, said openings being slightly larger than the parts which project into them for a reason to be explained. The clamp may be made with a lower inclined edge 29 which projects slightly below the adjacent part of the movable cutter, the upper portion of said clamp having a second similarly inclined portion 30 which is so related with the centers of the holes 27 and 28 that the clamp may be reversed with the inclined surface 30 downwardly. The means for holding the clamp in proper position includes a sheet steel spring 31 secured by screws 32 to the shuttle feeler F and having the lower edge thereof formed preferably as shown in Fig. 4 with the point of contact between the clamp 26 and said spring below the line joining the centers of the screw 13 and pin 25, said spring applying its pressure between the two loose points of support for the clamp.

The clamp is free to have a certain limited movement because of the loose fit afforded by the holes 27 and 28 and the clamp will assume a slightly inclined position with respect to the plane of action of the pivoted cutter when the latter is open because of the fact that the shoulder 24 is slightly less in thickness than the combined thickness of both cutters 10 and 14, as shown in Fig. 2.

In operation the cutter will perform as previously described and is more clearly set forth in the aforesaid Chevrette application, the clamp assuming the aforesaid slightly inclined position relatively to the pivoted cutter 14 when the latter is in low position. As the shuttle feeler rises the pivoted cutter will sever the thread and a portion of the latter will extend upwardly between the clamp 26 and the cutter 14 as shown in Fig. 4. As the pivoted cutter continues to move the clamp will straighten itself so as to be substantially parallel to the plane in which the cutter moves, but because of the loose mounting of said clamp the latter will be held in close contact with the thread no matter at what point in the ascent of the cutter the thread was actually severed.

From the foregoing it will be seen that we have provided a very simple form of clamp which is readily removable from the cutter without requiring the latter to be dismantled. Furthermore, the clamp is mounted for limited floating movement with respect to the cutter so that it may be held in contact with the cut filling even though there be considerable motion on the part of the cutter after the severance of the thread. Also, it will be seen that shoulder 24 is so proportioned as to permit the clamping member 26 to assume a slightly angular position with respect to the pivoted cutter 14 and that said clamp moves to make room for the pivoted cutter against the action of the spring 31, but in such a way as to remain in contact with the cut filling. These results are achieved by having the said spring 31 exert its pressure on the clamped member at a point between the screw 13 and pin 25 and preferably though not necessarily at a point below the line joining the centers of these two supports. The cutting, and therefore the points where the thread will be clamped, lie intermediate the studs which support the clamp. It will also be noted especially by reference to Fig. 2 that the pivoted cutter is held against the relatively fixed cutter by the combined action of the coil spring 21 and the leaf spring 31 to insure cutting of the thread but that the clamp is held against the pivoted cutter by the action of leaf spring 31 only, this reduced spring tension on the clamp preventing fraying or sheering of the weft thread.

Having thus described our invention it will be seen that changes and modifications may be made therein by those skilled in the art without departing from the spirit and scope of the invention and we do not wish to be limited to the details herein disclosed, but what we claim is:

1. In a thread cutter and clamp for a weft replenishing loom having a shuttle feeler pivoted above and behind the lay when the latter is in its forward position and having a cutting edge stationary with respect to the shuttle feeler, a pivoted cutter having a cutting edge to cooperate with the aforesaid cutting edge, and means to cause relative movement between the cutter and the cutting edge as the shuttle feeler moves toward and from shuttle feeling position, a thread clamping member, means to hold said clamping member yieldingly against the pivoted cutter to clamp the thread, and spaced points of support for said clamping member fixed to the shuttle feeler, said cutting edge of the pivoted cutter being intermediate the supports, said member being movable relative to the supports and being guided by the latter and said yielding means applying its force to the clamp between the supports.

2. In a thread cutter and clamp for a weft replenishing loom having a shuttle feeler pivoted above and behind the lay when the latter is in its forward position and having a cutting edge stationary with respect to the shuttle feeler, a pivoted cutter having a cutting edge to cooperate with the aforesaid cutting edge, and means to cause relative movement between the cutter and the cutting edge as the shuttle feeler moves toward and from shuttle feeling position, a thread clamping member adjacent the pivoted cutter, a pair of spaced guiding and supporting elements fixed to the shuttle feeler and extending loosely through said clamping member, said cutting edge of the pivoted cutter lying intermediate the supporting elements, and yielding means exerting pressure on the clamp between the supporting and guiding elements and tending to hold said clamp against the pivoted cutter to clamp a thread.

3. In a thread cutter and clamp for a weft replenishing loom having a shuttle feeler pivoted above and behind the lay when the latter is in its forward position and having a cutting edge stationary with respect to the shuttle feeler, a pivoted cutter having a cutting edge to cooperate with the aforesaid cutting edge, and means to cause relative movement between the cutter and the cutting edge as the shuttle feeler moves toward and from shuttle feeling positon, a thread clamping member adjacent the pivoted cutter, a pair of spaced guiding and supporting elements for said clamp, one of said supporting elements being the pivot about which the pivoted cutter moves, said supporting elements extending freely through the clamping member, said cutting edge of the pivoted cutter lying intermediate the supporting elements, and resilient means exerting a force on the clamping member between said supports and tending to hold said clamping member against the pivoted cutter to clamp a thread.

4. In a thread cutter and clamp for a weft replenishing loom having a shuttle feeler pivoted above and behind the lay when the latter is in its forward position and having a cutting edge stationary with respect to the shuttle feeler, a pivoted cutter to cooperate with the aforesaid cutting edge, and means to cause relative movement between the cutter and the cutting edge as the shuttle feeler moves toward and from shuttle feeling position, a thread clamping member adjacent the pivoted cutter, a pair of spaced supporting and guiding elements extending freely through said clamping member, said elements having clamping member engaging portions to limit movement of the clamping member toward the cutting edge, said portions being at different distances from the cutting edge so that the clamping member may assume an oblique position relatively to the cutting edge, and yielding means exerted against the clamping member between the supporting elements to hold said clamping member against the pivoted cutter to clamp a thread.

5. In a thread cutter and clamp for a weft replenishing loom having a shuttle feeler pivoted above and behind the lay when the latter is in its forward position and having a cutting edge stationary with respect to the shuttle feeler, a pivoted cutter having a cutting edge to cooperate with the aforesaid cutting edge, and means to cause relative movement between the cutter and the cutting edge as the shuttle feeler moves toward and from shuttle feeling position, a thread clamping member adjacent the pivoted cutter and having a portion to be engaged by the pivoted cutter as the latter has a cutting motion to clamp a thread, a pair of spaced supports extending freely through the clamping member, that portion of the pivoted cutter which engages the clamping member being intermediate said supports, and yielding means exerting a force against the clamping member between said supports tending to hold said clamp against the pivoted cutter.

6. In a thread cutter and clamp for a weft replenishing loom having a shuttle feeler pivoted above and behind the lay when the latter is in its forward position and having a cutting edge stationary with respect to the shuttle feeler, a pivoted cutter to cooperate with the aforesaid cutting edge, and means to cause relative movement between the cutter and the cutting edge as the shuttle feeler moves toward and from shuttle feeling position, a thread clamping member adjacent the pivoted cutter and having a portion to be engaged by the pivoted cutter as the latter has a cutting motion to clamp a thread, a pair of spaced supports extending freely through the clamping member, that portion of the pivoted cutter which engages the clamping member being intermediate said supports, yielding means exerting a force against the clamping member between said supports tending to hold said clamp against the pivoted cutter, the supports having clamping member engaging portions lying at different distances from the face of the pivoted cutter which engages the clamping member so that the latter is normally disposed obliquely with respect to the pivoted cutter.

7. In a thread cutter and clamp for a weft replenishing loom having a shuttle feeler pivoted above and behind the lay when the latter is in its forward position, and having a cutting edge stationary with respect to the shuttle feeler, a pivoted cutter to cooperate with the aforesaid cutting edge, and means to cause relative movement between the cutter and the cutting edge as the shuttle feeler moves toward and from shuttle feeling position, a thread clamping member located adjacent the pivoted cutter, a stud forming a pivot for the pivoted cutter extending freely through one portion of the clamping member and secured to the shuttle feeler, a second stud secured to the shuttle feeler spaced from the first named stud and extending freely through another portion of the clamping member and having a shoulder to limit movement of the clamping member toward the pivoted cutter, and resilient means exerting a force against the clamping member between said studs and holding the latter against the aforesaid shoulder, said shoulder being so placed that the clamping member is normally oblique with respect to the pivoted cutter and is moved against the action of said yielding means by the pivoted cutter as the latter has a cutting movement to clamp the thread between the clamping member and the pivoted cutter.

8. In a combined filling thread cutter and clamp, a support, a cutter mounted on the support, a second cutter pivoted to the support and cooperating with the first named cutter to sever a thread, a clamping member normally in contact with the pivoted cutter and held against angular movement relatively to the support, means to support said clamp so that the same is oblique with respect to the pivoted cutter when the cutter is in open position, and yielding means to hold said clamping member in said oblique position, a movement of the pivoted cutter to closing position engaging the clamp along a progressively moving point of contact and moving said clamping member so that when the cutter is in closed position said clamping member is substantially parallel to the pivoted cutter.

9. In a combined filling thread cutter and clamp, a support, a cutter mounted on the support, a second cutter pivoted to the support and cooperating with the first named cutter to sever a thread, a clamping member normally in contact with the pivoted cutter and held against angular movement relatively to the support, means to support said clamp so that the same is oblique with respect to the pivoted cutter when the cutter is in open position, and yielding means to hold said clamping member in said oblique position, a movement of the pivoted cutter to closing position engaging the clamp along a progressively moving point of contact and moving said clamping member so that when the cutter is in closed position said clamping member is substantially parallel to the pivoted cutter, and spaced supports for said clamping member, said resilient means applying a force between said supports.

10. In a thread cutter and clamp for a weft replenishing loom, a support, a cutter fixed relatively to the support, a clamping member supported by and held against angular movement relatively to the support, a pivoted cutter to cooperate with the first named cutter located between the latter and the clamp, and two separate resilient elements both of which tend to push the pivoted cutter against the fixed cutter and only one of which tends to push the clamp against the pivoted cutter.

11. In a thread cutter and clamp for a weft replenishing loom, a support, a cutter fixed relatively to the support, a clamping member supported by and held against angular movement relatively to the support, a pivoted cutter to cooperate with the first named cutter located between the latter and the clamp, said clamp having an opening therethrough, and a pair of resilient elements one of which exerts its force through the opening in the clamp, both of said resilient elements acting to force the pivoted cutter against the fixed cutter and only one of said elements acting to force the clamp against the pivoted cutter.

12. A clamping element for a loom thread cutting and clamping unit, said element being relatively thin and having smooth flat substantially parallel opposite sides, the edges of the element adjacent one end converging, said converging edges being symmetrically disposed about the axis of the element, and said element having a pair of spaced support receiving openings lying on the axis of the element and extending from one flat side through the element to the other side.

In testimony whereof we have hereunto affixed our signatures.

OSCAR V. PAYNE.
RICHARD G. TURNER.